United States Patent

Lane et al.

[15] 3,655,214
[45] Apr. 11, 1972

[54] LOAD CARRIER WITH ELEVATABLE LOAD ENGAGING SURFACE

[72] Inventors: Frank B. Lane, Annapolis; George M. Fulmer, Silver Springs, both of Md.

[73] Assignee: Gichner Mobile Systems, Inc.

[22] Filed: Sept. 30, 1966

[21] Appl. No.: 583,245

[52] U.S. Cl. ..................................................280/43.23
[51] Int. Cl. ..........................................................B62d 21/18
[58] Field of Search..............280/43.17, 43.1 B, 80 B, 81, 280/43.23, 34, 415.3, 404; 267/34, 15 A, 65; 105/368

[56] References Cited

UNITED STATES PATENTS

| | | | |
|---|---|---|---|
| 2,034,842 | 3/1936 | Stratton | 280/404 |
| 2,419,442 | 4/1947 | Dorsey | 280/404 |
| 2,941,816 | 6/1960 | Benson | 280/124 |
| 2,962,295 | 11/1960 | Tenenbaum | 280/80 |
| 3,006,657 | 10/1961 | Augustin | 280/124 |
| 3,071,393 | 1/1963 | Valentine | 280/124 |
| 3,102,738 | 9/1963 | De Roshia | 280/415 |
| 3,125,350 | 3/1964 | Thiermann | 280/34.1 |
| 3,259,400 | 7/1966 | Tantlinger | 280/324 |
| 3,347,563 | 10/1967 | Harbers | 280/415 |
| 2,879,076 | 3/1959 | Stricker, Jr. | 267/15 A |
| 3,147,024 | 9/1964 | Brockman | 280/81 |
| 3,285,621 | 11/1966 | Turner, Jr. | 280/43.23 |
| 3,315,974 | 4/1967 | Weaver, Jr. et al. | 280/35 |
| 3,325,181 | 6/1967 | Granning | 280/43.23 |

Primary Examiner—Benjamin Hersh
Assistant Examiner—Robert R. Song
Attorney—Clarence A. O'Brien and Harvey B. Jacobson

[57] ABSTRACT

A towed vehicle including two wheeled units normally spaced apart by a reach pole and capable of being moved towards and away from each other when loading a load carrying body or unloading a load carrying body. Each wheeled unit includes a frame structure and an axle and wheel assembly pivotally supported therefrom. Air bag units interconnect the axle and wheel assembly and the frame for varying the elevational position of the load supporting surface on the wheeled units. A self-contained pressure tank is provided for enabling adjustment of the load carrying surface independent of any towing vehicle.

12 Claims, 10 Drawing Figures

Fig. 1

INVENTOR
Frank B. Lane
George M. Fulmer

INVENTOR

Frank B. Lane
George M. Fulmer

BY *Clarence A. O'Brien*
and *Harvey B. Jacobson*
Attorneys

Patented April 11, 1972

INVENTOR
Frank B. Lane
George M. Fulmer

BY Clarence A. O'Brien
and Harvey B. Jacobson
Attorneys

Patented April 11, 1972

INVENTOR
Frank B. Lane
George M. Fulmer

BY Clarence A. O'Brien
and Harvey B. Jacobson
Attorneys

LOAD CARRIER WITH ELEVATABLE LOAD ENGAGING SURFACE

The present invention generally relates to a load carrier and more particularly relates to improvements in the undercarriage of such a load carrier which enables the load engaging surface thereof to be varied in elevational relationship to a supporting surface such as the ground surface whereby the load carried by the load carrier may be aligned with a cargo compartment, cargo ramp, dock or other surface which will receive the load from the load carrier thereby enabling the load to be expeditiously loaded onto the load carrier or unloaded from the load carrier. This invention has special utility when used in conjunction with aircraft of the cargo carrying type which are normally provided with a loading ramp or floor elevated above the ground surface and the elevational position of the cargo ramp or cargo floor varies with the load supported in the cargo aircraft due to tire deflection, spring or suspension deflection with load and variation in topography of the ground surface, the present invention provides for height variation of the load supporting members or load engaging surfaces of the load carrying vehicle to facilitate alignment of the supporting surfaces of the load carrying vehicle with the loading ramp or cargo floor of the aircraft.

In carrying out the present invention, the load carrier of the present invention employs an air bag suspension or air spring suspension in which inflatable air bags are operatively associated with components of the load carrying vehicle so that they will act not only as springs which operate in the normal manner of springs for cushioning or absorbing load shocks but also the air bags may be employed for raising or lowering the height of the loading carrying members while loading or unloading to aircraft cargo ramps, tail gates, floors or the like.

An object of the present invention is to provide a load carrying vehicle having load supporting members thereon for supporting a load such as a shelter unit or van with the undercarriage of the load carrier having a structure which enables variation in the elevational position of the load being carried by the load supporting members by employing an inflatable air bag suspension assembly together with a structure to enable the load supporting members to be moved longitudinally in relation to each other to facilitate sliding removal of the load from the load carrier and also sliding movement of the load onto the load carrier.

Another object of the present invention is to provide a load carrier in accordance with the preceding in which a high pressure air supply tank is provided on the load carrier for inflation of the air bags in the air bag suspension assembly for enabling a large number of inflation and deflation cycles to be performed with a single air supply tank.

Still another object of the present invention is to provide a load carrying vehicle in accordance with the preceding objects having means for limiting the upward movement of the load supporting members to prevent damage to the air bag suspension assembly by movement beyond the normal limits of expansion of the air bags.

Still another important object of the present invention is to provide a load carrier in accordance with the preceding objects together with means indicating the optimum operating position of the air bag suspension thereby enabling such optimum over-the-road conditions to be readily set by varying the air pressure within the air bags of the air bag suspension assembly.

Still another very important feature of the present invention is to provide a load carrying vehicle with an elevatable supporting surface in accordance with the preceding objects which is relatively simple in construction, rugged and long-lasting, lightweight in comparison with known load carriers of the same type and relatively inexpensive to manufacture, operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the load carrier of the present invention for use in conveying a load generally designated by the numeral 12 over the road or ground surface 14 for loading the load 12 onto a surface such as a loading deck 14 which may be in the form of a tailgate, loading ramp or cargo compartment floor of a cargo type aircraft while the load 12 is preferably in the form of a box-like shelter unit or van of rigid construction of predetermined modular size which may contain various equipment, mechanism or the like constituting the load. The load surface 14 will vary in height between various types of aircraft, due to tire and suspension deflection depending upon the load on the aircraft, variations in topography and the like. The load carrier 10 of the present invention enables the load 12 and the load supporting members constituting a part of the load carrier to be varied in elevational position for alignment with the load surface 14 so that the load 12 may be moved from the carrier 10 onto the load surface 14 or from the load surface 14 onto the carrier 10.

Figure 1:
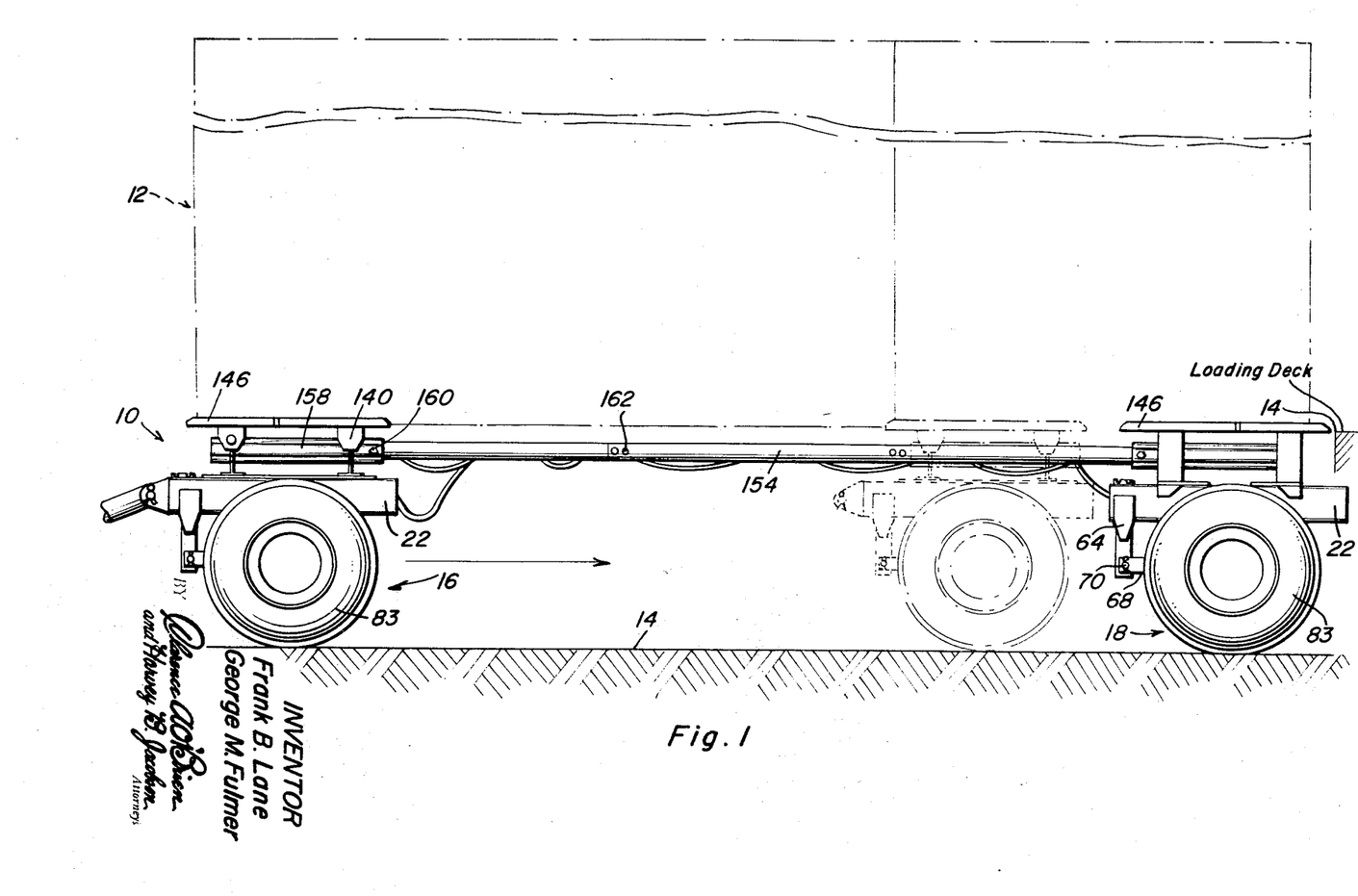
FIG. 1 is a side elevational view of the load carrier of the present invention illustrating the normal position of the load supporting members in relation to a load receiving surface and also illustrating in broken line, the position of the front unit of the load carrier when it has been moved toward the rear unit for sliding the load from the rear of the load carrier or in position for receiving the front end of the load so that subsequent movement of the front unit of the load carrier will slide the load onto the load carrier.
Figure 2:
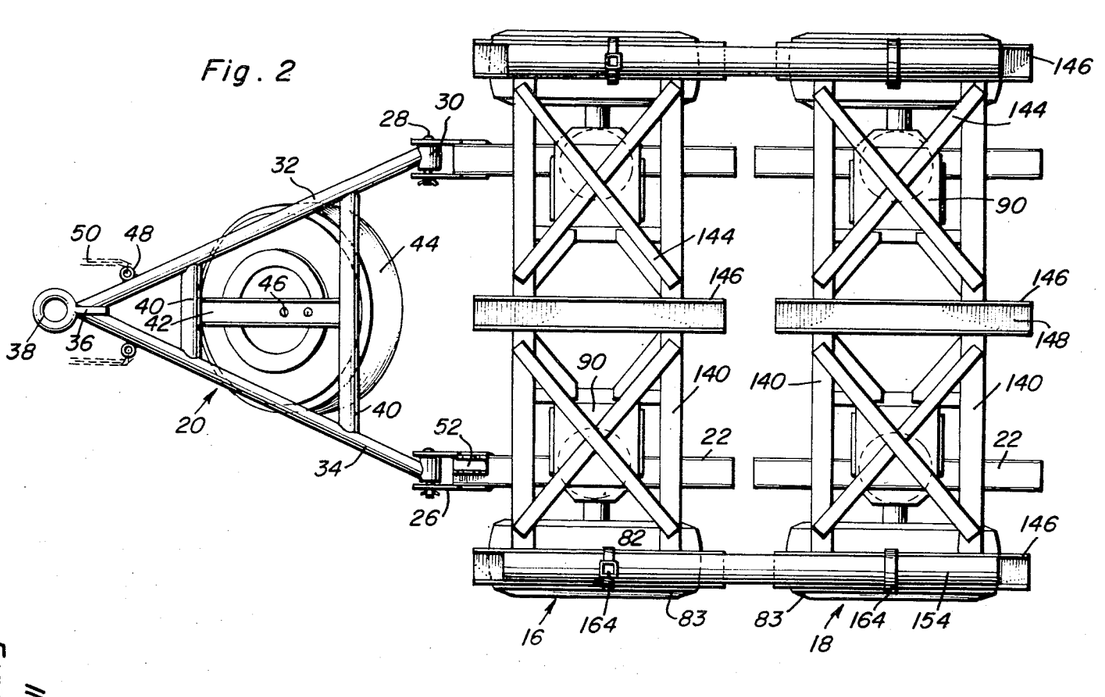
FIG. 2 is a top plan view of the load carrier of the present invention illustrating the front and rear units in short coupled condition so that it may be readily transported to an area of use in a compact condition.
Figure 3:
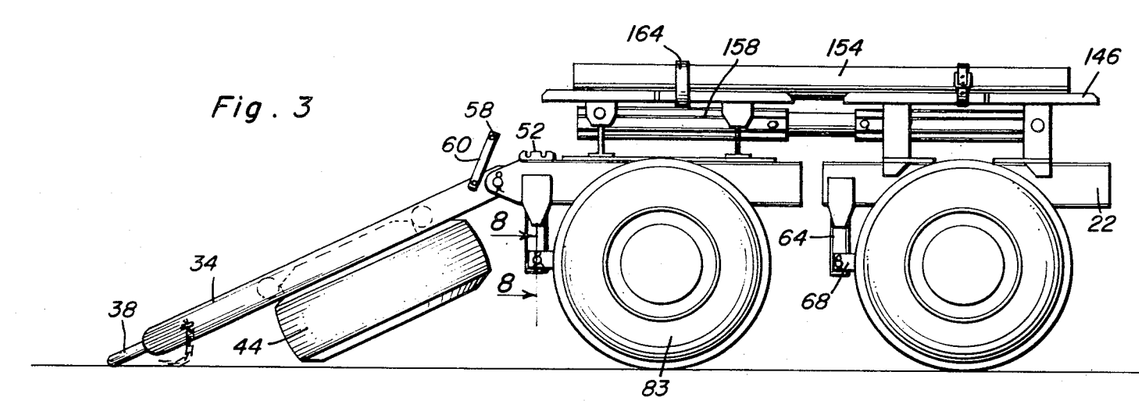
FIG. 3 is a side elevational view of the construction of FIG. 2.

The load carrier 10 includes two separate units designated as a front unit 16 and a rear unit 18 which are substantially identical as illustrated in FIG. 2 but the front unit 16 has a tongue assembly 20 connected thereto for connection with a suitable towing vehicle. FIG. 6 illustrates the details of the front unit 16 and when taken in conjunction with FIG. 5, it will be noted that there is provided a pair of longitudinally extending frame members 22 rigidly interconnected by transverse frame members 24 which may be of any suitable construction employed in the frame or chassis of a load carrying vehicle such as channel beams, I-beams, hollow box beams or the like. As illustrated, the longitudinal frame members 22 are preferably box frame members while the transverse frame members 24 are preferably channel-shaped frame members.

At the forward end of the longitudinal frame members 22, the tongue assembly 20 is connected thereto by the provision of a forwardly extending bracket 26 rigidly fixed to each side of the hollow box-shaped longitudinal frame member 22 thus forming pairs of pivot lugs or ears for receiving pivot bolts or pins 28 extending through tubular journal elements 30 at the rear ends of a pair of forwardly converging tongue forming members 32 and 34 which preferably may be tubular members of cylindrical configuration. The forward ends of the members 32 and 34 are interconnected by a plate 36 having a horizontally disposed loop or eye 38 rigidly fixed thereto for forming a rigid triangular shaped tongue assembly having the attaching loop or eye 38 at the forward end thereof for connection with a suitable towing vehicle. Intermediate the ends of the members 32 and 34 is a pair of transversely extending brace members 40 and interconnecting the transverse brace members 40 is a bracket 42 for supporting a spare tire and wheel assembly 44 by any suitable supporting means such as fastening bolts or the like 46. Also, the converging members 32 and 34 have loops 48 welded thereto for attachment of safety chains or the like to assure that the load carrier 10 will be retained in attached relation to a towing vehicle.

On the upper surface of the forward end of one of the frame members 22 there is provided an upstanding plate 52 with a pair of notches 54 therein with the notches being either inclined upwardly and rearwardly or provided with a forwardly extending lower end portion at 56 for receiving a pin on the end of a latch bar 60 that is pivotally attached to the member 34 by a pivot bolt 62 thus enabling the latch pin 58 to be engaged with one of the notches 54 for locking the tongue assembly 20 in elevated position as illustrated in FIG. 6.

Figure 8:
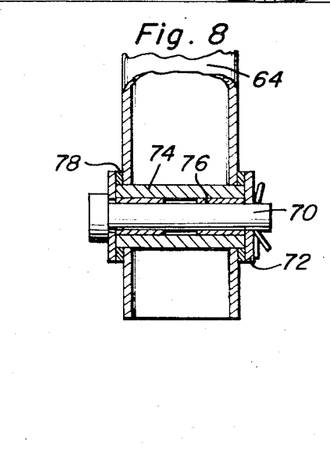
FIG. 8 is a detailed sectional view taken substantially upon a plane passing along section line 8—8 of FIG. 3 illustrating the supporting structure for the trailing arms for supporting the axle from a depending pylon-type support.

Also, the forward end of each longitudinal frame member 22 has a depending supporting bracket or pylon 64 in substantially perpendicular relation thereto and rigidly fixed thereto by connecting plate 66 rigidly fixed to the side surfaces of the frame member 22 and the depending pylon 64 as by welding or the like thereby forming a rigid depending supporting unit which is preferably in the form of a hollow type structural member. At the lower end of the depending pylon 64, a rearwardly trailing suspension arm 68 is mounted for pivotal movement by the use of a pivot pin and retainer assembly 70 extending through forwardly projecting lugs or ears 72 on the suspension arm 68. A bearing sleeve 74 extends through the pylon 64 and bushings 76 are disposed between the sleeve 74 and the pin 70 and washers 78 are disposed between the ears or lugs 72 and the pylon 64 as illustrated in FIG. 8 thus enabling movement of the suspension arm 68 substantially in a vertical plane about the axes defined by the pivot pin 70. The ears or lugs 72 may be integral with the suspension arm 58 or may be in the form of a U-shaped yoke welded thereto and reinforced by gussets plates 80 so that the suspension arm 68 will form a support for a transversely extending axle 82 mounted at the rear end thereof so that the axle 82 will be constrained in its movement except in a vertical direction as defined by the vertical swinging of the rear ends of the suspension arms 68. The inherent stiffness of the suspension arms 68, depending pylons 64 and longitudinal frame members 22 together with the interconnection between these components serves to prevent or restrain the axle 82 from movement in any direction except in a vertical up and down direction in substantially a straight line path although there will be a slight arcuate deviation from the straight line condition but within the limits of the movement of the axle 82 in relation to the frame 22, varies very little fore and aft movement of the axle 82 during its oscillation about the pivot axis defined by the pivot pin 70. Each end of the axle 82 is provided with a tire and wheel assembly 83 of conventional construction with suitable brake conduits 86 being connected thereto with the brake conduits 85 being communicated with an air brake booster assembly 87 of conventional construction with it being pointed out that various braking systems may be employed as deemed appropriate.

The axle 82 is rigidly connected to the rear of the suspension arm 68 by a suitable bracket 84 and forming a part of this bracket 84 is a supporting plate 86 for an air bag 88 which is of conventional construction with the top of the air bag 88 being connected to an attaching bracket or plate 90 fixed to the undersurface of the longitudinal frame member 22 in any suitable manner. An air conduit 92 is provided at the upper end of the air bag 88 which extends through the attaching plate 90 in a conventional manner selective inflation or deflation of the air bag 88 in a manner described hereinafter. Thus, the air bag 88 forms a cushioning and shock absorbing assembly between the wheel assembly 83 and the frame member 22 will be cushioned. An indicator arm 94 is attached to the bottom plate 86 and includes a pointer 96 for registry with a depending index plate 98 for indicating the relative positions of the frame member 22 and the bottom plate 86 of the air bag assembly thereby indicating the degree of inflation or deflation of the air bag 88 so that the air bag 88 may be inflated or deflated depending upon the load carried by the load carrier so that the air bag will operate in the optimum position as the load carrier proceeds over the road.

Figure 9:
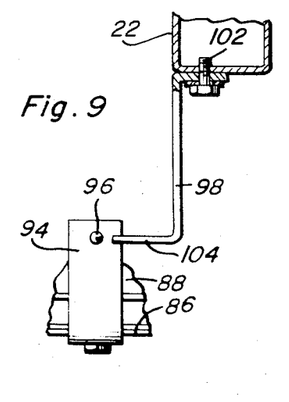
FIG. 9 is a detailed sectional view taken substantially upon a plane passing along section line 9—9 of FIG. 6 illustrating the indicating mechanism for indicating the optimum position of the air bag for over the road operation.

Rigid with the top plate 90 of the air bag assembly is a depending plate-like structure 100 which extends downwardly alongside of the air bag 88 and terminates in an outwardly flared lower edge which serves as a guide and somewhat of a guard for the air bag which also represents conventional structure insofar as air bag assemblies are concerned. FIG. 9 illustrates the construction of the index plate 98 and the manner in which it is attached to the frame 22 by a suitable bolt 102 and the like and the lower end of the index plate also has a laterally extending index portion 104 for alignment with the point 96 on the indicator arm 94 and it is pointed out that this structure is located rearwardly of the air bag to enable observation thereof by the person inflating and deflating the air bag 88.

The rear unit 18 is substantially identical to the front unit insofar as the frame members, suspension arms, wheel units, axles and air bag suspension is concerned and since these structures are identical, the same reference numerals are employed for identifying these components.

Figure 4:
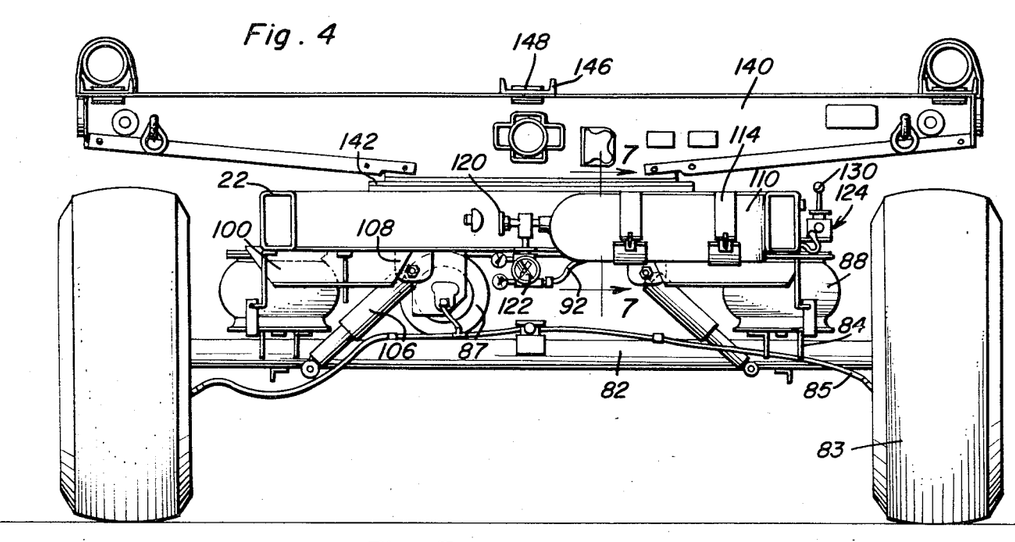
FIG. 4 is a rear end elevational view of the load carrier of the present invention illustrating the structure for mounting the air tank, the association of the air bags in relation to the axles and frame assembly.
Figure 5:
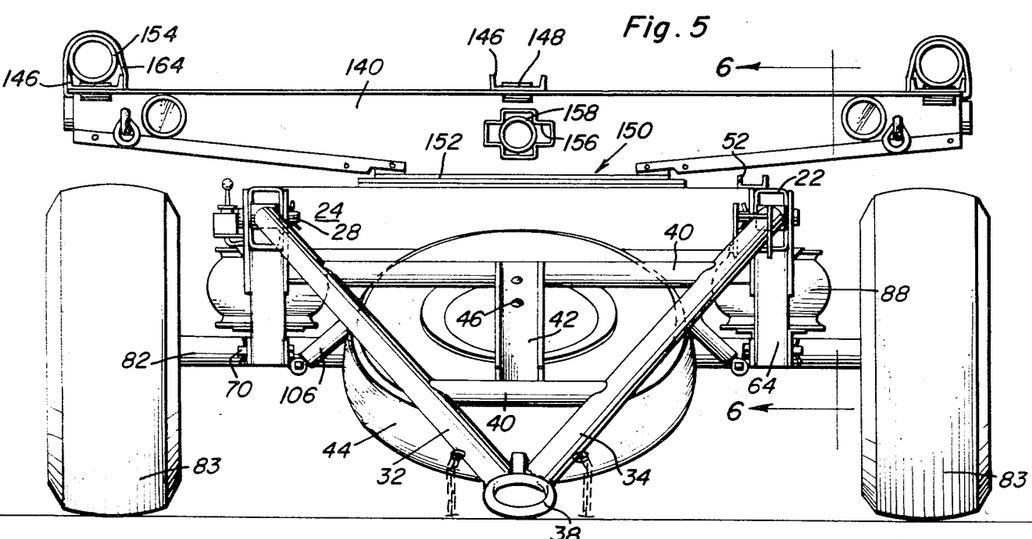
FIG. 5 is a front end elevational view of the load carrier illustrating further structural details of the invention.
Figure 6:
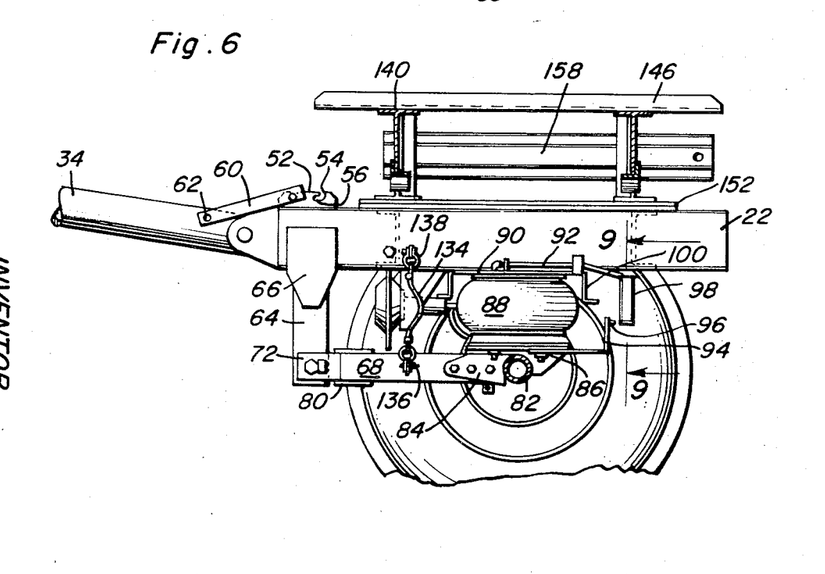
FIG. 6 is a detailed sectional view taken substantially upon a plane passing along section line 6—6 of FIG. 5 illustrating the structural details of the axle, trailing arm support therefor and the air bag associated therewith together with the frame structure and the flexible member for limiting the expansion of the air bag.
Figure 7:
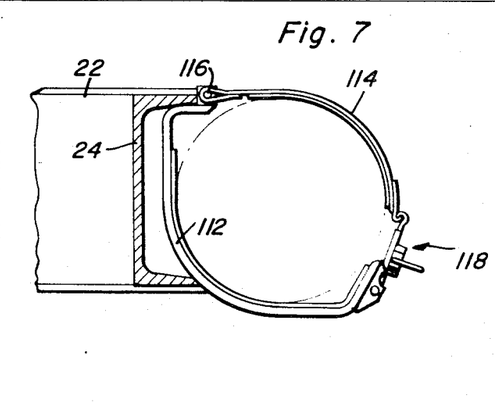
FIG. 7 is a detailed sectional view taken substantially upon a plane passing along section line 7—7 of FIG. 4 illustrating the structure for removably supporting the air supply tank.

As illustrated in FIGS. 4 and 5, a shock absorbing assembly 106 extends between each outer end of the axle 82 and depending lugs 108 on the transverse frame members 24. The lugs 108 may be attached to the supporting structure 90 for the air bag 88, the longitudinal frame member 22 or a transverse frame member 24 or any suitable bracing therebetween for enabling the shock absorbers to extend upwardly in a converging manner and the shock absorbers 106 are of the conventional airplane type for performing in the normal manner between the axle member 82 and the supported framework to control and dampen relative movement therebetween. The rearmost transverse member 24 on the rear unit 18 has an air supply tank 110 supported therefrom by arcuate brackets 112 and straps 114 having one end connected thereto as at 116 and the other end thereof connected by a connection assembly 118 to form a strap-like bracket encircling the cylindrical air tank 110. The connector 118 may be of a construction to enable release and clamping thereof by a manually operated construction which does not require the use of any tools to enable the air tank 110 to be replaced when necessary without employing or requiring any tools. The air tank 110 includes the usual shut-off valve 120 of the hand wheel type and is connected to a pressure reducing valve 122 by a suitable quick disconnect coupling which also may be manually operated to provide a predetermined air pressure to the air conduit system 92 connected with the air bags through a control valve assembly generally designated by numeral 124 orientated alongside of the frame member 22 of the rear unit 18 and supported therefrom by a suitable bracket or plate 126. The air pressure regulator 122 is of conventional construction and is employed with a suitable gauge arrangement and control knob for indicating the pressure on both sides of the regulator and enabling the regulator to be set to the desired outlet pressure. This construction enables the air supply tank to be replaced with a full tank when the air supply therein is depleted without employing any special tools or wrenches which quite frequently are unavailable when the load carrier is in a remote location. In actual practice, high pressure air in the tank which may be at about 2,000 p.s.i. may be reduced to about 125 to 150 p.s.i. for supply to the air bags. This arrangement enables a large supply of air, sufficient for approximately 15 cycles to be supplied by a single tank whereas low pressure tanks such as those used for brake air supply in vehicles, although larger in actual dimensions, cannot supply this amount of air since they would hold about 10 percent of the free air volume of the smaller high pressure air tank employed in this invention. Thus, the only high pressure air is in the tank 110 and the line to the pressure regulating valve 122 with the remainder of the air conduit system 92 and control valve 124 being relatively low pressure air.

Figure 10:
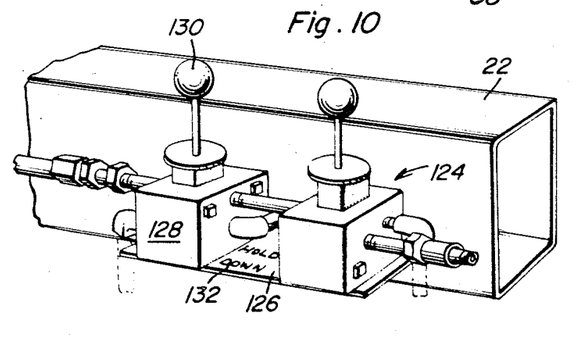
FIG. 10 is a fragmental perspective view of the control valve assembly for enabling expansion and contraction of the air bags.

There is provided a control valve 128 for each air bag 88 and each control valve 128 has a control handle 130 and the control handle 130 will have three positions which may be indicated by suitable indicia placed on the supporting plate 126 as indicated by numeral 132 or any other suitable area may be provided for the indicia. For example, when the control handle 130 is pushed inwardly toward the frame member 22, the particular air bag 88 with which it is associated will be inflated. When the handle is in a neutral position, in a straight up position, as illustrated in FIG. 10, the valve will be in a hold position so that air is locked into the air bag. When the valve handle 130 is moved to the outer position away from the frame member 22, it will be in the down position so that air is vented out of the air bag with which the valve is associated. This provides each of the air bags with its own valve and control handle with the valves for the air bag on the rear unit being on the rear unit and the control valves for the air bag on the front unit being mounted on the front unit. Thus, by using the valves after loading or unloading, each air bag can be inflated or deflated for compensation for unevenness of the load. Inasmuch as the air bag manufacturer provides a definite height for the optimum running position for the air bag regardless of the load and since the bag pressure required varies with the load an optimum running position may be determined by inflating or deflating the air bags and matching the pointer 96 with the index member 104 by visually observing the position of these components while either inflating or deflating the air bag with which each of the indicator pointer 96 and the index member 104 is associated. With this construction, the proper height of each of the air bags may be adjusted even with the load being supported being greater at certain points than at other points.

A limit structure is provided for limiting the expansion or elongation of the air bag 88 and this structure includes a flexible tension line or cable 134 connected to an eye member 136 on the trailing suspension arm 68 intermediate the ends thereof and the other end of the cable 134 is connected to the frame 22 by a similar eye member 138. This cable or other suitable flexible tension member will restrain the air bag or air spring from excessive elongation which might occur under some circumstances such as when the load carrier was being used in conjunction with helicopter transportation.

The load supporting assembly on the rear unit 18 is rigid with the longitudinal and transverse frames and includes laterally extending frame members or bolsters units 140 secured to the underlying frame members by a suitable rigid plate type interconnecting unit 142. The transverse frame members 140 are interconnected by diagonal brace members 144 to form rigid units and the upper edges of the frame members 140 are interconnected by a plurality of longitudinally extending and upwardly opening channel-shaped load engaging and supporting members 146 which form load supporting surfaces for the load 12. Each channel-shaped load supporting member 146 may have a panel 148 of material facilitating sliding of the load 12 which may be a composition material such as "Micarta." The load unit, shelter, van or the like 12 has corresponding depending longitudinal rails which slidably fit within the channel-shaped supporting members 146 and slide against the composition material 148 which facilitates the sliding movement of the load. The relative elongated construction of the channel-shaped supporting members 146 will also enable the load 12 which is of rigid construction to retain the front and rear units of the load carrier in aligned position.

The front unit 16 is identical insofar as the transverse frame members or bolsters 140 are concerned together with the diagonal braces 144 and longitudinal load supporting members 146. However, since the front wheels and axle 82 must pivot about a vertical axis for steering purposes, the front transverse frame members or bolsters 140 are connected with the transverse frame members 24 by a fifth wheel type of interconnecting assembly generally designated by numeral 150 and which includes rotatable plates 152 disposed in rotatable sliding contact with each other with a vertical pin structure being employed for defining a vertical axis of pivotal movement for the frame assembly in relation to the transverse frame members 140 which is necessary in steering of the load carrier.

A sectional reach tube or coupling pole 154 interconnects the front and rear units 16 and 18 with the transverse members 140 having an opening 156 therethrough rigidly receiving correspondingly receiving tubular members 158 which connect and reinforce the transverse members 140. The sections of pole 158 are connected with tubular members 158 by removable pin-type fasteners 160 and the removable sections are correspondingly interconnected by removable pin-type or bolt-type fasteners 162 to provide a rigid coupling pole or reach tube between the front and rear sections, which can telescope through either section. When the removable sections of the coupling pole 154 are removed, they are stored on the channel-shaped supporting members 146 at the outer edges of the front and rear units as illustrated in FIG. 2 and are retained in that position by straps 164 or the like and they serve to couple the front and rear units in a short coupled condition so that the load carrier may be towed over the road in a short coupled condition without a load thereon. When a load is placed on the load carrier with the front and rear units disposed in extended position, either one or both of the removable sections of the coupling pole 154 is used although normally both sections will be used to extend the load carrier to its desired over-all length and to retain the front and rear units in proper orientation. In some instances, it is not necessary to use the coupling pole inasmuch as the load unit itself will serve to rigidify the front and rear units with the load unit itself being rigid and being securely locked to the front and rear units by virtue of the tracks on the load unit being retained in the channel-shaped support members 146 by any suitable type of holddown structures for binding the load to the load carrier. If the coupling pole is used and it is desired to unload the load at a destination, it has to be removed or at least the pin 160 removed from the front stationary section and the telescopic sections of the coupling pole 154 may be slid therethrough and the coupling pole may be either removed as the front unit moves toward the rear or left in place depending upon subsequent use of the load carrier.

Various ancillary items may be provided on the load carrier such as reflector units on both the size and rear, running lights, brake lights and the like as required by various regulations for operation on public highways, various hooks and anchor type devices for enabling the load to be secured in place and enabling connection of trailing towed units or the hose supports for supporting the various brake hoses and air hoses for the air bag inflation system for supporting the hoses in position when the front unit and rear unit are adjacent to each other or extended into remote relation. The particular construction of the tire and wheel assemblies, axle assemblies, brakes, shock absorbers and the like are not illustrated in detail since these are conventional and commercially available products. Also, if desired, latch structures may be provided on the rear of the rear unit for positive connection with the cargo aircraft or other load deck or service to retain the rear unit in connected relation to the aircraft or other load surface to enable a winch mechanism to be connected between the front and rear units to cause the front unit to move towards the rear unit for sliding the load off of the rear unit onto the aircraft when the load has been disconnected from the rear unit and left connected with the front unit. Thereafter, the load may be disconnected from the front unit and pulled or towed into the aircraft by a suitable winch mechanism or the like. Conversely, when the load is being removed from the aircraft, the outer end of the load is slid onto the rear unit and the front unit when the front unit is adjacent the rear unit and retained in position adjacent the aircraft. After the load has been moved onto both the rear unit and front unit, the rear unit is then locked to the aircraft and the front unit pulled away from the aircraft thus pulling the load from the aircraft so that the rear end portion thereof is supported by the rear unit after which the load may be suitably bound onto the load unit by suitable load binders or the like and if desired, the coupling pole inserted into position. To prevent any possibility of the load unit sliding forwardly during braking operations or the like, a stop may be provided in the front end of the front channel support member 146 if desired. The various components are constructed of conventional structural elements which are readily available and the size and rigidity of the various components may be varied depending upon the requirements of the loads to be carried.

This structure also has considerable merit from a military standpoint in that it reduces weight by eliminating metal springs and hydraulic mechanisms which are relatively heavy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A load carrying vehicle comprising a wheeled unit including a load supporting surface, an axle and wheel assembly directly under and pivotally connected to the load supporting surface for relative pivotal movement about an axis parallel to the axle and spaced therefrom, and means supporting the load supporting surface from the axle and wheel assembly in spaced relation to the pivot axis for cushioning and supporting the load supporting surface and elevating and lowering the load supporting surface for enabling alignment of the load supporting surface with a surface to support a load when it is removed from or placed on the load supporting surface, said means including an air bag assembly having one end attached to the axle and wheel assembly and the other end attached to the load supporting surface in spaced relation to the pivot axis for cushioning movement of the load supporting surface in relation to the axle and wheel assembly, said air bag assembly adapted to be communicated with a pressurized air supply source for selectively inflating and deflating the air bag assembly for increasing and decreasing the height of the air bag assembly by varying the air pressure therein thereby raising and lowering the load supporting surface and also enabling adjustment of the height of the air bag assembly for enabling the air bag assembly to be disposed at optimum height for most efficient over-the-road operation, flexible means interconnecting the axle and wheel assembly and the load supporting surface for limiting the movement of the axle and wheel assembly away from the load supporting surface to prevent over elongation of the air bag assembly, and cooperating indicating means mounted on the load supporting surface and the axle and wheel assembly for indicating the optimum height of the air bag assembly for over-the-road operation.

2. The structure as defined in claim 1 together with a source of pressurized air, said source of pressurized air being in the form of a replaceable container having high pressure air therein, and a pressure reduction valve for supplying pressurized air to the air bag assembly thereby enabling a relatively large number of inflation and deflation cycles of the air bag assembly to be accomplished by a relatively small container for adjusting the height of the air bag assembly.

3. A load carrying vehicle comprising a wheeled unit including a load supporting surface, an axle and wheel assembly directly under and pivotally connected to the load supporting surface for relative pivotal movement about an axis parallel to the axle and spaced therefrom, and means supporting the load supporting surface from the axle and wheel assembly in spaced relation to the pivot axis for cushioning and supporting the load members, each channel-shaped support member including a bottom panel of composition material for facilitating sliding movement of the load in relation thereto, a tongue assembly comprising a forwardly extending tongue having the rearward end thereof pivotally connected to the frame structure for swinging movement in a vertical plane, a spare tire and wheel assembly mounted on the undersurface of said tongue, and means interconnecting the tongue and the frame structure for retaining the tongue in upwardly inclined position when the tongue is not connected to a towing vehicle for enabling access to the spare tire and wheel assembly.

4. A load carrying vehicle comprising a front and rear wheeled unit each of which includes a load supporting surface, said front and rear units being independent and spaced from each other when supporting a load and movable toward each other to slide the load over the load supporting surface of one of said units when the other of said units is moved in relation thereto, said units being retained in spaced relation by an adjustable reach pole during over-the-road operation, said reach pole being rendered inoperative when the front and rear units are moved in relation to each other, each wheeled unit including an axle and wheel means underlying the load supporting surface, and suspension means between each axle and wheel means and load supporting surface for supporting the load supporting surface and cushioning road shock, said suspension means on said units selectively adjusting the elevational position of the load supporting surfaces in relation to each other and in relation to load supporting means independent of the vehicle.

5. The structure as defined in claim 4 wherein each axle and wheel means includes a rigid axle extending transversely under the load supporting surface, a wheel on each end of said axle, said suspension means including a pair of air bags disposed between each axle and the load supporting surface with the air bags being spaced longitudinally of the axle adjacent the wheels whereby the air bags serve to support the load supporting surface and cushion road shock and are capable of adjusting the elevational position of the load supporting surface to orient it vertically such as when loading or unloading a load.

6. A load carrying vehicle comprising a front and rear wheeled unit each of which includes a load supporting surface, said front and rear units being independent and spaced from each other when supporting a load and movable toward each other to slide the load over the load supporting surface of one of said units when the other of said units is moved in relation thereto, said units being retained in spaced relation by an adjustable reach pole during over-the-road operation, said reach pole being rendered inoperative when the front and rear units are moved in relation to each other, each wheeled unit including a frame structure, an axle and wheel assembly underlying and pivotally connected to the frame structure for relative pivotal movement about an axis parallel to the axle and spaced therefrom, an air bag assembly having one end operatively connected with the axle and wheel assembly and the other end attached to the frame structure in spaced relation to the pivot axis for cushioning movement of the load supporting surface in relation to the axle and wheel assembly, said air bag assembly being adapted to communicate with a source of pressurized air for selectively inflating and deflating the air bag assembly for raising and lowering the load supporting surfaces for alignment with an adjacent load supporting surface to enable a load on the load supporting surfaces on the wheeled units to be moved onto or off of the adjacent load supporting surface.

7. The structure as defined in claim 6 wherein said frame structure includes a pair of depending supports adjacent one end thereof, said axle and wheel assembly including a pair of longitudinally extending arms pivotally supported from the lower ends of the supports, a rigid axle extending rigidly between the ends of the arms remote from their connection with the supports, said air bag assembly including a pair of air bag units disposed between the frame structure and rigid axle with the upper and lower ends of the air bag units being disposed substantially in vertical alignment when the arms are substantially parallel with the frame structure, said load supporting surface on each of the wheeled units including a longitudinal slideway for slidably receiving and guiding the load during movement thereof.

8. The structure as defined in claim 6 wherein each wheeled unit includes a pair of transversely spaced air bag assemblies, and control valve means associated with each air bag assembly for adjusting the height of the load supporting surface and transversely levelling the load supporting surface on each wheeled unit for vertical alignment of the load supporting surfaces on the wheeled units with an adjacent load supporting surface throughout the width of the load supporting surfaces on the wheeled units.

9. The structure as defined in claim 6 together with means interconnecting the axle and wheel assembly and the load support surface on each wheeled unit for limiting the movement of the axle and wheel assembly in relation to the load supporting surface to prevent damage to the air bag assembly.

10. The structure as defined in claim 6 together with cooperating indicating means mounted between the load supporting surface and the axle and wheel assembly on each wheeled unit for indicating the optimum height of the air bag assembly on each wheel unit for over-the-road operation.

11. The structure as defined in claim 6 together with a tongue assembly extending longitudinally from one of said wheeled units and comprising a forwardly extending tongue having the rearward end thereof pivotally connected to the wheeled unit for swinging movement in a vertical plane, and means interconnecting the tongue and the wheeled unit for retaining the tongue in upwardly inclined position when the tongue is not connected to a towing vehicle.

12. The structure as defined in claim 11 together with a spare tire and wheel assembly mounted on the undersurface of said tongue for storing the spare tire and wheel assembly so that it will not interfere with relative movement between the wheeled units and to provide access thereto when the tongue is in upwardly inclined position.

* * * * *